(12) United States Patent
Kudelski et al.

(10) Patent No.: US 7,975,279 B1
(45) Date of Patent: Jul. 5, 2011

(54) IMPULSE PURCHASE SYSTEM FOR PAY-TELEVISION

(75) Inventors: André Kudelski, Lutry (CH); Marco Sasselli, Chardonne (CH); Philippe Stransky, Marchissy (CH); Laurent Laffely, Le Mont-sur-Lausanne (CH)

(73) Assignee: Nagravision SA, Cheseaux-sur-Lausanne (CH)

( * ) Notice: Subject to any disclaimer, the term of this patent is extended or adjusted under 35 U.S.C. 154(b) by 2018 days.

(21) Appl. No.: 10/019,518

(22) PCT Filed: Jul. 6, 2000

(86) PCT No.: PCT/IB00/00913
§ 371 (c)(1),
(2), (4) Date: Dec. 28, 2001

(87) PCT Pub. No.: WO01/05151
PCT Pub. Date: Jan. 18, 2001

(30) Foreign Application Priority Data

Jul. 9, 1999 (CH) ........................................ 1269/99

(51) Int. Cl.
*H04N 7/167* (2006.01)
(52) U.S. Cl. .......................................... 725/31; 725/104
(58) Field of Classification Search .................... 725/104
See application file for complete search history.

(56) References Cited

U.S. PATENT DOCUMENTS

| | | | | |
|---|---|---|---|---|
| 5,521,979 A | * | 5/1996 | Deiss | 380/212 |
| 6,157,719 A | * | 12/2000 | Wasilewski et al. | 380/210 |
| 6,594,361 B1 | * | 7/2003 | Chaney et al. | 380/221 |
| 6,671,881 B1 | * | 12/2003 | Tamer et al. | 725/31 |
| 7,023,992 B1 | * | 4/2006 | Kubota et al. | 380/210 |
| 7,051,360 B1 | * | 5/2006 | Ellis et al. | 725/136 |
| 2003/0159147 A1 | * | 8/2003 | Young et al. | 725/47 |

FOREIGN PATENT DOCUMENTS

| | | |
|---|---|---|
| EP | 0895415 A | 2/1999 |
| GB | 2193867 A | 2/1988 |
| WO | WO 9843426 A | 10/1998 |

OTHER PUBLICATIONS

*Functional Model of a Conditional Access System*, EBU Review—Technical, Be, European Broadcasting Union, Dec. 21, 1995, pp. 64-77, No. 266, Brussels.

* cited by examiner

*Primary Examiner* — Brian T Pendleton
*Assistant Examiner* — Olugbenga Idowu
(74) *Attorney, Agent, or Firm* — Stuart J. Friedman

(57) ABSTRACT

In a pay television system, the choice and the confirmation of an impulse purchase are performed by the user on presentation, by means of a screen, of a grid of programmes. The selection by this user of a particular programme of his choice from the grid is subsequently confirmed in the system by an entitlement management message, this message being specific to an impulse purchase. In order to authorize the immediate screening of the selected transmission, the entitlement management message specific to an impulse purchase is contained in the data tied to the presentation of the grid.

3 Claims, 1 Drawing Sheet

| D, H, Des | Pr | Msg |
|---|---|---|

| D, H, Des | Ref | D, H, Des | Ref | D, H, Des | Ref | ......... |

Fig. 1

| Ref | Pr | Msg |

Fig. 2

| D, H, Des | Pr | Msg |

Fig. 3

IMPULSE PURCHASE SYSTEM FOR PAY-TELEVISION

The present invention relates to a system according to the preamble of claim 1.

In the known systems for the choosing of a particular programme by a viewer of or listener to audiovisual transmissions, the choosing of a pay programme by a user, hereinbelow referred to as a subscriber, is performed in two ways:
1) the subscriber telephones the Subscriber Administration Centre so as to purchase a product such as a film or a filmed sports event. This procedure is being employed less and less;
2) the subscriber receives, together with the data stream transmitted for example by satellite, a programme grid presenting the offering in a schematic manner, with a view to easy choice from this grid displayed on visual means such as a cathode ray screen or a liquid crystal screen. Such a process is described for example in U.S. Pat. No. 5,038,211.

The present state of the art consists in dispatching a data stream comprising:
  video information, in particular coded or scrambled video information;
  information required for displaying the aforesaid programme grid;
  entitlement checking messages, describing the necessary privileges for access by the subscriber to a product,
  entitlement management messages, or EMMs, intended for administering the user's profile, a particular type of entitlement management message, which is specifically intended for impulse purchasing, and is commonly referred to as IEMM in the trade.

The problem which arises relates to the total time required by the subscriber to see his purchase recorded. This time is in fact made up of:
a) the time required to press the buttons, for example of a remote control, relating to the choice of the desired product, up to the final confirmation button such as "OK",
b) the time required for the subscriber to receive the next IEMM.

This time required to receive the IEMM is dependent on the volume of traffic on the data stream and on the number of subscribers. Since this IEMM is a particular type of EMM, it is conveyed in an EMM broadcasting cycle. Some time, seemingly long to the subscriber, may therefore pass before the cycle in question has terminated and the impulse purchase is confirmed by the system. This time may be several minutes when the product offering is considerable. During this time, the purchaser will not be able to utilize his control and might perhaps change his mind before the product is accessible.

The present invention proposes to solve this problem by the means described in the characterizing part of claim 1.

A programme grid generally comprises, per transmission apt to form the subject of an impulse purchase, at least one transmission name, often a description of the transmission, a price for purchase by the user, and sometimes so-called "rating" information, especially in the case where the television viewer must be of a minimum age required by legislation to view or listen to the transmission. These data are tied to the presentation of the programme grid destined for the user.

By including the entitlement management message specific to the impulse purchase of the relevant transmission with the data tied to the said presentation of the grid, it is possible to circumvent the cycle time required in the prior art.

The user, having made his choice and pressed the button for confirming the impulse purchase, need wait only for the system to have finished the current cycle of broadcasting of the entitlement management messages. This results in improved convenience.

In a particular embodiment of the invention, the entitlement management message is used locally in a hardware subassembly installed at the user's premises, this hardware subassembly comprising a microprocessor in which is stored a subscriber authorizations and subscriptions profile relating to the user.

This hardware subassembly takes for example the form of a chip card reader, the chip card containing a microprocessor or chip, which can be read and decrypted by the reader by means known per se.

In a particular embodiment of the invention, the entitlement management message specific to the impulse purchase has the possibility of entailing two notifications: on the one hand that to authorize viewing, and on the other hand that to veto this authorization. This possibility affords additional flexibility in the administration of the subscriptions taken out by the users.

The invention will be better understood by virtue of the detailed description which follows and which refers to the appended drawings, in which:

FIG. 1 represents the stream of data according to the state of the art which is intended for making up the programme grid, FIG. 2 represents the data stream according to the state of the art containing the entitlement message, FIG. 3 represents the data stream according to the invention combining the information intended for the programme grid and the entitlement message.

Represented in FIG. 1 is the stream SI known in the state of the art and comprising packets, each packet being specific to a transmission. This packet, once interpreted, defines a row in the programme grid.

A packet therefore comprises date D and time T information as well as a descriptor Des for the transmission proposed. With this packet is associated a reference Ref which will allow the system to make the link between the row selected by the user and the entitlement message EMM containing the necessary authorizations.

This EMM message is represented in FIG. 2 and comprises the identifier Ref for linking the message of the SI stream to the EMM message. It contains a subscription item Msg which allows the security module (in general a chip card) to store the data required for decoding the relevant transmission.

According to the invention, FIG. 3 represents the new message SI which makes it possible to form the programme grid and which comprises the textual information such as date D, time T and description of the transmission Des, as well as the entitlement message Msg.

When instructed by the user, the entitlement data Msg are immediately transferred to the security module, making it possible to profit, if the credit and authorization conditions are fulfilled, from the purchased transmission.

It should be noted that the subscription message Msg may, according to a variant of the invention, be broken down into a purchase condition part, for example the purchase price, and another purchase cancellation condition part. If for example a user who has purchased a transmission which starts in five minutes decides not to watch it, it is the cancellation condition which will be applied and which might reimburse only part of the amount depending on the policy decided by the broadcaster.

In the detailed description which will follow, the example will be taken of a plurality of encoders each receiving an analogue audio or video stream and each restoring a compressed digitized stream. Each of these compressed digitized streams enters in turn a multiplexer, commonly abbreviated MUX, which also processes a so-called EMM entitlement management message stream, this EMM stream being common to all the compressed digitized streams, several entitlement checking message streams, a so-called Service Information or SI stream, and finally a so-called PSI programme specific information stream.

The PSI stream simply provides the decoders, situated at the other end of the broadcasting channel such as a satellite, with the so-called PID packet identifier numbers, these packets being generated by the multiplexer.

Thus, by way of example, a first packet will be furnished with a PID header bearing its number, and will bear a video stream element of a transmission from Television Suisse Romande 1. The next, bearing another PID header, will bear for example an audio stream element from Television Suisse Romande 2. The third may bear behind its PID an audio stream element from Television Suisse Romande 1, and so on and so forth.

The PSI stream does not properly speaking contain so-called intelligible information, such as the name of the station. It merely gives the PID numbers intended for the inlet decoder, so as to provide it with an Ariane wire and allow it to reconstruct the string of packets by abutting them without error.

It is the SI Service Information stream whose role is to transport the necessary data for filling in the programme grid. These data are, generally, so-called intelligible data. Indeed, they explicitly provide the name of the stations (such as TSR1 and TSR2 in the above examples), give a list of frequencies for all the transports, or else a list of all the transmissions, this enumeration being non limiting.

The programme grid is organized temporally. The information contained in the Service Information stream is in fact arranged as time segments. A first segment may for example occupy the time slot from midnight to 4 a.m., and the next segment another time slot beginning at 4 a.m. The programme grid sets out this information in formats referred to as descriptors. These descriptors are standardized and chronicle the name of the programme, its type (sport, information, transmission for children, etc), the start time, the duration, this list being non limiting.

The present patent application extends also to a descriptor specifically intended for receiving the entitlement management message specific to the impulse purchase of the relevant transmission. The confirmation by the user of the choice of this transmission therefore allows, subsequent to a straightforward reading of the field corresponding to this descriptor, the recording of this purchase in the system for administering the subscribers, without having to wait for the end of a cycle of entitlement management messages.

At this point the decoder transmits the information contained in the entitlement message to the chip card which will proceed to the checking of the necessary authorization criteria (of the credit for example) and will store the corresponding authorization. This authorization is treated as a subscription, that is to say it authorizes subsequent decoding of the selected transmission.

It may be seen in this example that the entitlement management message specific to the impulse purchase IEMM is coded together with Service Information and is stored in the programme grid, instead of following the cycle corresponding to the normal entitlement management messages.

In one of the forms of execution of the invention, the price of the transmission is transmitted together with the IEMM message. Thus, not only is the authorization administered through this message but so is its value, which value will be debited in the event of a purchase from the subscriber's card. This makes it possible to adopt a pricing policy which differs depending on the type of transmission.

The invention claimed is:

1. System for selecting and confirming an impulse purchase for pay television, the system comprising:
    a display device for presentation to a user a listing of programs; and
    means for selection by the user of a program of a particular choice of the user from the listing, the choice confirmed in the system by an entitlement management message, the message being specific to an impulse purchase and comprising conditions defining authorization of viewing and conditions of cancellation of the authorization;
    the program listing comprising date and time of broadcast of an impulse purchase program as well as the entitlement management message responsive to the authorization of said impulse purchase program, the system further comprising a security module and means to transfer the entitlement management message specific to the impulse purchase to the security module when the user selects said impulse purchase program and, if the conditions for authorizing viewing of the program selected by the user are met, recording the impulse purchase and granting access to the purchased program.

2. System according to claim 1, wherein the entitlement management message is used locally in a hardware subassembly installed at the user's premises, the hardware subassembly comprising a security module in which is stored subscriber authorizations and subscriptions profile relating to the user.

3. System according to claim 1, wherein the entitlement management message specific to the impulse purchase includes a notification to authorize viewing, or a veto of the viewing authorization.

* * * * *

UNITED STATES PATENT AND TRADEMARK OFFICE
CERTIFICATE OF CORRECTION

PATENT NO. : 7,975,279 B1  Page 1 of 1
APPLICATION NO. : 10/019518
DATED : July 5, 2011
INVENTOR(S) : Andre Kudelski et al.

It is certified that error appears in the above-identified patent and that said Letters Patent is hereby corrected as shown below:

On the Cover Page, item (73) Assignee:, delete "Nagravision SA." and substitute "Nagravision SA."

Signed and Sealed this

Sixteenth Day of August, 2011

David J. Kappos
*Director of the United States Patent and Trademark Office*